United States Patent [19]

Armanini

[11] 4,192,691

[45] Mar. 11, 1980

[54] METAL OXIDE PLATELETS AS NACREOUS PIGMENTS

[75] Inventor: Louis Armanini, Pleasantville, N.Y.

[73] Assignee: The Mearl Corporation, Ossining, N.Y.

[21] Appl. No.: 954,928

[22] Filed: Oct. 26, 1978

[51] Int. Cl.² ............................ C09C 1/00; C09C 1/36
[52] U.S. Cl. ................................... 106/291; 106/300; 106/302; 106/304; 106/308 B; 106/DIG. 3; 427/218; 427/337; 428/363; 428/404
[58] Field of Search ..................... 106/291, 300, 308 B; 427/218, 337; 428/404, 363

[56] References Cited

U.S. PATENT DOCUMENTS

| 3,123,490 | 3/1964 | Bolomey et al. | 106/291 |
|---|---|---|---|
| 3,788,871 | 1/1974 | Mullio | 106/291 |
| 3,861,946 | 1/1975 | Waitkins et al. | 106/291 |
| 4,075,030 | 2/1978 | Bundy et al. | 106/291 |

*Primary Examiner*—Helen M. McCarthy
*Attorney, Agent, or Firm*—Ostrolenk, Faber, Gerb & Soffen

[57] ABSTRACT

Unsupported metal oxide platey nacreous pigments are derived from metal oxide coated mica by a unique dissolution process and show higher luster and coverage than the pigment from which they are derived. If the metal oxide coated mica shows a reflection interference color, the unsupported product derived from it shows higher luster and greater reflection color intensity.

15 Claims, No Drawings

METAL OXIDE PLATELETS AS NACREOUS PIGMENTS

BACKGROUND OF THE INVENTION

Nature's nacreous (pearlescent) pigment, plate-like guanine microcrystals from fish, has only limited uses because of high cost, source variations and unsuitability for some applications. As a result, a number of synthetic nacreous pigments have been developed. One of the most important of these, titanium dioxide coated mica, consists of mica platelets having adherent crystalline $TiO_2$ coatings thereon. The composite pigment has good reflectivity characteristics, a high degree of stability with respect to heat and chemical agents, and it is non-toxic making it suitable for cosmetic applications. Such pigments in which the $TiO_2$ is in the anatase form are described, for example, in Klenke, et al, U.S. Pat. No. 3,087,827; Linton U.S. Pat. No. 3,087,828; Rieger U.S. Pat. No. 3,418,146; and Quinn U.S. Pat. No. 3,437,515. The pigments in which the titanium dioxide coating is in the rutile crystalline form is described in DeLuca, et al, U.S. Pat. No. 4,038,099.

Metal oxides other than titanium dioxide have been used to prepare similar types of nacreous pigments by coating on mica platelets as a substrate. Examples include ferric oxide (Linton U.S. Pat. No. 3,087,829), zirconium dioxide (Linton U.S. Pat. No. 3,087,828), tin dioxide (Esselborn U.S. Pat. No. 4,040,859) and the like.

The metal oxide coating on the mica has a high refractive index and provides the optical effects, including high luster or reflectivity, coverage, interference reflection color (if the metal oxide coating is sufficiently thick), and absorption color (if the metal oxide contains color material). The mica, on the other hand, has a low refractive index and is essentially a carrier. It makes almost no contribution to the optical effects of the pigment. The weight of the mica in the pigment usually lies between 40 and 90% and most usually in the range of 60 to 80%.

Although procedures have been developed to classify and purify the mica, certain variations from the natural source persist through to the final product. Most sources of mica are unsuitable for use in nacreous pigments since they are quite dark or cannot be adequately ground to yield the desired dimensions for the pigment platelet substrates. Additionally, mica darkens considerably during the calcination process used to preparing the metal oxide coated mica product resulting in undesirable color effects.

In many applications, the incorporation of the pigment into the system to be colored thereby is limited by the weight of the pigment. Frequently, a maximum loading (concentration) is reached before an optimum in optical properties of the system is obtained.

Unsupported $TiO_2$ pigments have also been disclosed in the technical literature. See, e.g., Haslam U.S. Pat. No. 2,941,895; Jenkins U.S. Pat. No. 3,018,186; Miller U.S. Pat. No. 3,071,482; Morita U.S. Pat. No. 3,395,203; Mochel U.S. Pat. No. 3,340,006; and Japan No. 35-15579 (275573). Generally, the methods of preparation of such pigments involve the hydrolysis of $TiCl_4$ or a titanium ester on a flat surface during extrusion through a narrow orifice to form the desired flat shape of $TiO_2$. The latter is produced in relatively small yield as an amorphous material containing hydrated forms of $TiO_2$ as well as some contamination from the starting reactants. Such products are not very stable and react with the components of certain systems in which they are incorporated, such as nitrocellulose lacquers. Their light stability is also less than desirable, making them unsuitable for various applications in both cosmetics and plastics. Further, it is difficult to accurately regulate their thickness as is necessary in the preparation of nacreous pigments exhibiting predetermined interference colors. In addition, calcining unsupported $TiO_2$ pigment platelets prepared as previously described results in a high degree of fracturing of the platelets, primarily due to the absence of a support or substrate therefor. Control over platelet thickness during such a calcination is difficult, if not impossible, to achieve.

Unsupported crystalline titanium dioxide platelet nacreous pigments are described by Waitkins, et al in U.S. Pat. No. 3,861,946. The unsupported nacreous pigment is achieved by coating titanium dioxide on gypsum platelets followed by dissolving away the calcium sulfate substrate. When the titanium dioxide is in the anatase form, the pigment contains titanium dioxide, silicon dioxide and calcium sulfate. When the titanium dioxide is in the rutile form, the pigment contains titanium dioxide, stannic oxide, aluminum oxide and calcium sulfate. The unsupported platelets of titanium dioxide formed as described in this patent do not have the high degree of luster displayed by titanium dioxide coated mica because the calcium sulfate platelet is not nearly as smooth as are the mica platelets.

It is among the objects of the present invention to provide an improved unsupported metal oxide nacreous pigment which can be used in a wide variety of cosmetic and plastic applications and which possesses improved stability, luster, mechanical integrity and other properties, as compared with previously proposed metal oxide nacreous pigments. A further object of the invention is to provide a method for the preparation of such pigments in high yield and with precise control over particle sizes and thicknesses which determine nacreous pigment characteristics. These and other objects and advantages of the invention will become apparent from consideration of the following detailed description of the preferred embodiments thereof.

SUMMARY OF THE INVENTION

This invention relates to nacreous pigments which are useful for cosmetic formulations and in various plastic articles and coatings. More particularly, it relates to improved nacreous metal oxide pigments and methods for the preparation thereof. The invention is based on the discovery that pearlescent metal oxide coated mica pigments will form an improved pearlescent pigment after the mica substrate is substantially dissolved away and the disadvantages associated with metal oxide coated mica pigments are overcome, and further that the mica can be dissolved away from the titanium dioxide coated mica pigment without dissolving the coating. Dissolution is effected by a mixture of hydrofluoric acid and a mineral acid at elevated temperature and the resulting nacreous pigment displays improved luster properties. If the metal oxide coating is sufficiently thick to exhibit interference reflection color, the derived pigment also exhibits reflection color but at a greater color intensity and luster.

DESCRIPTION OF THE INVENTION

The unsupported metal oxide nacreous pigments of the present invention are prepared by subjecting the metal oxide coated mica nacreous pigment prepared by any of the methods heretofore known to an extractive dissolution in aqueous acid. This is conveniently carried out by dispersing the metal oxide coated mica nacreous pigment in the aqueous acid at a concentration of about 1–20%, preferably about 2–10%. The concentration of acid in the system can be about 3–50% and is preferably about 9–30%.

The acids used to dissolve the mica can be a combination of hydrofluoric acid and one or more mineral acids such as sulfuric acid and the like. The extractive solution can contain about 1–20% of the hydrofluoric acid, preferably about 4–10% and about 2–30% of the mineral acid, preferably about 5–20%. The ratio of mineral acid to HF can vary over a wide range from 10:1 to 1:10 but is preferably about 1:1 to 1:8. The treatment can be carried out at temperatures of about 30°–100° C. with temperatures of about 50°–80° C. being preferred. The extractive dissolution is continued until the desired degree of mica has been removed which can take as short as 0.25 hour to as long as 20 hours or more. The acid concentration, temperature and treatment time are interrelated such that the higher the acid concentration, the shorter treatment time and lower temperatures can be used.

Within the foregoing ranges of concentrations time and temperature, suitable adjustments should be made to obtain optimum results for the particular metal oxide involved since the metal oxides vary in their resistance to attack by the acid. For example, anatase $TiO_2$ is not as resistant to the acid treatment as is rutile $TiO_2$ and there is some slight attack and dissolution of the anatase $TiO_2$. The difference in acid resistance results in differences in the resulting unsupported titanium dioxide nacreous pigment. Thus, if a $TiO_2$ coated mica pigment shows an interference reflection color, the unsupported pigment derived from rutile $TiO_2$ exhibits the same interference reflection color while the unsupported pigment from anatase $TiO_2$ shows a reflection color corresponding to a thinner titanium dioxide platelet thickness. For example, a red reflecting anatase coated mica after acid treatment exhibited a gold reflecting color and a green reflecting anatase coated mica pigment after acid treatment exhibited a blue reflecting color. Also, the luster and interference reflection color intensity improvement over the same characteristics of the original titanium dioxide coated mica product is greater when the $TiO_2$ is rutile than when it is anatase. Optimum conditions can readily be determined for the metal oxide coated mica pigment by a few laboratory experiments.

Following the extractive dissolution, the resulting unsupported metal oxide nacreous pigment can be recovered in any convenient fashion such as by filtering the slurry hot or cold, washing the filtered pigment and thereafter drying it.

As a result of the improved luster and color intensity, less of the unsupported metal oxide nacreous pigment is necessary than the metal oxide coated mica nacreous pigment from which it is derived to achieve at least equivalent pigment qualities. For example, to an aqueous solution containing 10% sulfuric acid and 5% hydrofluoric acid was added a rutile titanium dioxide coated mica pigment in an amount sufficient to be 5% of the total slurry and the mixture was heated to 70° for one hour. After cooling, the slurry was filtered, washed and dried. The original rutile $TiO_2$ coated mica pigment exhibited a pearl reflection appearance in a standard drawdown (described hereinafter), and the resulting unsupported pigment at one-half the concentration in the standard drawdown displayed superior luster and coverage.

The amount of mica which is dissolved can be adjusted as desired. As the total amount of mica which is dissolved is increased, the luster or reflectivity of the resulting product increases. In general, at least half of the mica is dissolved such that the resulting product contains about 20% or less mica. A small residue of mica, generally about 1 to 20% does not have any deleterious effect on the optical properties of the pigment and contributes some improved mechanical properties to the resulting pigment platelet. It is, however, also possible to dissolve away all of the mica and realize a nacreous pigment composed entirely of metal oxide and having further increased luster, if desired.

The dissolution treatment affects substantially only the mica substrate. A rutile $TiO_2$ coated mica nacreous pigment exhibiting a blue reflection color was subjected to the dissolution treatment. The composition of the starting pigment was 54% mica, 45% titanium dioxide and 1% stannic oxide, while the resulting unsupported nacreous pigment had a composition of 90% titanium dioxide, 8% mica and 2% stannic oxide. The original pigment exhibits a blue reflection color and luster when a standard drawdown is observed and the unsupported pigment, at half the concentration in the drawdown, has the same blue reflection color but with somewhat greater luster and intensity. This observation, together with the analytical data, shows that the dissolution treatment is such that only the mica portion of the rutile $TiO_2$ coated mica pigment is being attacked and dissolved, and the titanium dioxide and stannic oxide portions are virtually undissolved.

Metal oxide coated mica pigments with combinations of metal oxides can be treated in a similar fashion. For example, a pigment exhibiting a gold reflection color as well as a gold absorption color contained 64% mica, 30% rutile $TiO_2$, 5% ferric oxide and 1% stannic oxide. The resulting product after dissolution treatment contained 73.2% titanium dioxide, 12.3% ferric oxide, 12.0% mica and 2.5% stannic oxide. A comparison of drawdowns with the original pigment and the resulting pigment with the latter at one-half the pigment concentration, showed the resulting unsupported pigment to have significantly higher luster and color intensity.

The reasons for the improvement in the unsupported product are not known or well understood. The mica portion of a titanium dioxide coated mica makes only a minor optical contribution to the appearance of a coating in which the pigment is incorporated. However, the $TiO_2$ coated mica platelet is rather thick, the total platelet thickness of the sandwich being about 0.40 microns for a pearl reflecting pigment. The unsupported pigment, in which the mica substrate is essentially dissolved away, is one in which a single titanium dioxide coated mica pigment yields two $TiO_2$ platelets, each about 0.05 micron in thickness. It may very well be that the unsupported pigment with a much thinner platelet and weight orients more readily in a coating than does the original titanium dioxide coated mica. This may account for some improvement in luster but it has not yet been possible to substantiate this explanation.

When the gold reflecting pigment described above is converted to the unsupported product, there is a marked improvement in luster and reflection color intensity. Improved orientation of the platelet particles in the drawdown coating is insufficient to explain this improvement. Microscopic examinations, using a reflection microscope, has yielded the following information.

Mica platelets which are used as the substrate material for the metal oxide coatings have varying thicknesses and some of these thicknesses yield interference colors. The maximum refractive index of the mica platelet is 1.58, and therefore, the mica itself makes no significant contribution to the optical effects of the resulting pearlescent pigment with the metal oxide coating on it.

When a pearl-reflecting $TiO_2$ coated mica is observed by reflection under the microscope, different platelets show different reflection colors. Since the colors vary from one platelet to another, the net reflection color is essentially white, since the various colors from the individual platelets are added. In the case of a gold reflecting metal oxide coated mica, the individual platelets under the reflection microscope can be seen to show a gold reflecting color, but many of the platelets show colors which are different from the gold such as red, blue and green. When the same batch of this product is subjected to the dissolution treatment and the subsequently derived pigment platelets are examined under the reflection microscope, practically all platelets exhibit a gold reflecting color, and very little of any other reflection color is seen. Therefore, the various mica platelet thicknesses other than those yielding a gold reflection color actually detract from the luster and the reflection color intensity of the metal oxide coated mica pigment. Since this defect is removed by the dissolution of the mica substrate, the derived unsupported gold reflecting metal oxide pigment shows a substantial improvement in luster and reflection color intensity.

The unsupported platelets of metal oxides of this invention can be used advantageously for a variety of purposes for which high luster, reflection interference color, or combined absorption color and interference color are desired. Among the uses for which this type of pigment has advantageous effects, particularly compared to other nacreous pigments that are available, include the making of simulated pearl beads, non-settling thixotropic nail enamel formulations, lustrous coating of vinyl-imitation leather fabric, coating of exterior automobile metal parts, and production of pearl buttons by means of casting in unsaturated polyester resins.

Reflectance measurements referred to herein are made by examination of standard drawdowns on a hiding power chart (Form 010P of the Morest Company), half of which is black and half of which is white. The coating on the black part of the card displays the reflection color when it is examined by specular reflection, and the coating on the white portion displays the transmission color when it is viewed at an angle not equal to the angle of incidence.

The standard drawdowns are prepared from a suspension of 3% pigment platelets in a nitrocellulose lacquer of the following composition:

| | |
|---|---:|
| Nitrocellulose RS type 15-20 sec. | 2.9% |
| Nitrocellulose RS type 30-40 sec. | 6.6 |
| Isorpopanol | 5.1 |
| Amylacetate | 44.8 |
| n-Butyl acetate | 37.6 |
| Mono-butoxydiethylene glycol | 3.0 |
| | 100.0% |

In this formulation which has a viscosity of approximately 2000 centipoises at 25° C., the two grades of nitrocellulose are used in order to obtain the desired combination of solids content and viscosity. The mono-butoxydiethylene glycol is used to prevent "blushing" or clouding of the lacquer film by condensation of water vapor from the atmosphere. The drawdowns are made with a Bird film applicator producing a wet film of approximately 0.003 inch thickness on the hiding power chart held firm against a Bird vacuum plate.

Reflectance measurements are made of the light which is specularly reflected from the black part of the card. The spectrophotometric curve of the sample was determined with a Leres Trilac Spectrophotometer by the technique described by Greenstein and Bolomey, Journal of the Society of Cosmetic Chemists, Volume 22, pages 161-177 (Mar. 4, 1971). The angle of incidence is 15° to the normal, and the angle of viewing is 15°; these conditions are expressed as $-15°/15°$. Reflectance is measured relative to a pressed cake of barium sulfate. The reflectance at the maximum, $R_{max}$, and the average reflectance are measures of nacreous luster. The wavelength at the maximum, $\lambda_{max}$, is an indication of color, although the entire curve is required to describe the color completely.

The amount of mica which is dissolved can be adjusted so that more or less mica is left behind in the platelets. As the total amount of mica dissolved is increased, luster or reflectivity increases. This is exemplified in the following Table 1 where a green rutile $TiO_2$ coated mica was dissolved to varying extents by increasing the amount of sample to be dissolved for a given amount of HF and $H_2SO_4$. In each case, the dissolving solution consisted of 2.0 ml. HF (50%), 5.0 ml. $H_2SO_4$ (98%), and 50 ml. distilled water, and heating was carried out at 70° C. for 1 hour.

TABLE 1

| Dissolution of Green Reflecting Rutile $TiO_2$ Coated Mica | | | |
|---|---|---|---|
| Weight of Sample | Yield | $R_{max}$ | Reflection Color |
| 1.00 | 56% | 66.5% | Blue-Green |
| 2.00 | 58 | 63.0 | Green |
| 3.00 | 65 | 54.0 | Yellow-Green |
| 4.00 | 72 | 53.6 | Yellow-Green |

When the mica is almost completely dissolved, maximum luster is achieved. With more mica remaining, the luster decreases. At the same time, the color changes from a yellow-green to a blue-green.

If the maximum luster is desired, the mica should be almost completely dissolved. This is demonstrated in Table 2 in which the same green rutile $TiO_2$ coated mica was treated with 5 ml. of 98% $H_2SO_4$ and the amount shown of HF to attain maximum dissolution of the mica:

TABLE 2

| Dissolution of Mica in Green Rutile $TiO_2$ Coated Mica (70° C.) | | | | | | |
|---|---|---|---|---|---|---|
| HF (50%) | Distilled Water | Weight of Sample | Time Treat. | Product Yield | $R_{max}$ | $\lambda_{max}$ |
| 2.0 ml. | 25 ml. | 1.00 g. | 1 hr. | 55% | 70.1 | 480 nm. |
| 2.0 | 100 | 1.00 | 1 | 58 | 62.5 | 510 |
| 4.0 | 50 | 1.00 | 5 | 50 | 67.5 | 480 |
| 4.0 | 50 | 0.50 | 5 | 48 | 69.0 | 470 |
| 3.0 | 50 | 1.00 | 2 | 52 | 68.1 | 494 |

Since the original pigment contains about 50% mica, complete dissolution of the mica results in high reflectivity values. When rutile TiO₂ coating on the mica is used, only the mica is dissolved, and the rutile TiO₂ remains intact. This is true even for high ratios of HF to pigment. Further evidence of this behavior is given in the set of experiments given in the Table 3. Rutile TiO₂ coated mica samples, having different thicknesses of the rutile on the mica, and therefore different reflection colors, were subjected to the dissolution procedure. In each case, 1.00 g. of sample was treated with a mica dissolving solution consisting of 2.0 ml. HF (50%), 5.0 ml. H₂SO₄ (98%), and 50 L ml. distilled water, and the heating was carried out at 70° C. for 1 hour.

TABLE 3

Rutile Coated Mica: Dissolution of Mica from Different Reflection Color Samples

| Mica Content | Original Color | Color After Treatment | Yield |
|---|---|---|---|
| 50% | Green | Blue-Green | 56% |
| 60 | Red | Red-Orange | 40 |
| 65 | Gold | Lt. Gold | 38 |
| 70 | White | White | 27 |

In every case, the mica portion of the platelet was substantially dissolved away while the TiO₂ was not attacked. An increase in reflectivity over the original samples was observed.

When the anatase modification of TiO₂ coated mica is treated, some anatase is dissolved. In the following Table 4, anatase TiO₂ coated mica samples of varying colors, and hence, of varying mica concentrations, were subjected to the same dissolution procedure. In each case, the acid solution consisted of 2.0 ml. HF, 5.0 ml. H₂SO₄, and 50 ml. distilled water per 1.00 g. of pigment, and the heating was carried out at 70° for 1 hour.

TABLE 4

Dissolution of Mica in Anatase TiO₂ Coated Mica of Various Colors

| Mica Content | Original Color | Color After Treatment | Yield | $R_{max}$ | $\lambda_{max}$ |
|---|---|---|---|---|---|
| 50% | Green | Blue | 35% | 43.5 | 400 |
| 60 | Red | Gold | 32 | 68.0 | 680 |
| 65 | Gold | Lt. Gold | 31 | 85.7 | 568 |
| 70 | White | White | 20 | 67.0 | 400 |

A constant amount of mica and TiO₂ was removed for all the original samples. This amounts to about 70% since the yields varied from 31% to 35%. All the reflectivities were generally of good quality, although not as great as when rutile TiO₂ is used. It is also noted that the reflection colors were shifted downwards somewhat in each case after completion of the dissolution treatment.

It is also possible to remove the mica from a nacreous pigment of mica coated by a layer of TiO₂ followed by a layer of another metal oxide, such as Fe₂O₃ or Cr₂O₃. This is shown in the following Table 5. In each case, the treatment consists of subjecting 1.00 g. of the pigment to a solution of 2.0 ml. HF, 5.0 ml. H₂SO₄, and 50 ml. distilled water, with heating at 70° C. for 1 hour.

TABLE 5

Dissolution of Mica Coated with TiO₂ and Metal Oxide

| Sample Type | Mica Content | Metal Oxide Layer | Yield | $R_{max}$ | $\lambda_{max}$ |
|---|---|---|---|---|---|
| Anatase Green | 50% | Cr₂O₃ | 51% | 60.8 | 478 |
| Rutile Gold | 60 | Fe₂O₃ | 38 | 102 | 640 |

The reflectivities represent in both cases a substantial increase over the undissolved samples, and the reflectivities were measured at a pigment concentration of one-half that of the undissolved sample.

Pigments based on mica of different sizes and thicknesses may be used in the dissolution process. Thus, the products used in cases given above were based on mica platelets having a size range from 10 to 35μ. When a considerably smaller mica with a size range from 5–20μ was used as a substrate for TiO₂-coated mica and subsequently dissolved by the process, similar results were obtained as shown in the following Table 6. In each case, 1.00 g. of pigment was subjected to dissolution treatment by a solution of 2.0 ml. HF, 5.0 ml. H₂SO₄, and 50 ml. distilled water. The slurry was heated at 70° C. for 1 hour.

TABLE 6

Dissolution of Smaller Size Mica in Products With Anatase and With Rutile TiO₂

| Sample Coating | Original Color | Color After Treatment | Yield | $R_{max}$ |
|---|---|---|---|---|
| Anatase | Gold | White | 33% | 80.4 |
| Anatase | Red | Lt. Gold | 37 | 71.9 |
| Anatase | Blue | Orange | 44 | — |
| Anatase | Green | Blue | 46 | 45.9 |
| Rutile + Fe₂O₃ | Gold | Gold | 50 | 72.6 |

Some TiO₂ coated mica products have an additional coating of a colorant such as iron blue and the like. Such products can also be successfully treated to remove the mica layer. Thus, blue reflecting anatase TiO₂ coated mica which has a surface coating of iron blue can be subjected to the dissolution process. Substantially all of the mica is removed, as well as a small part of the TiO₂ coating. The absorption colorant, iron blue, is untouched so that the resulting new pigment consists of a red reflecting interference pigment with no mica present having a blue absorption color.

Variations in the amount of distilled water, HF, H₂SO₄, and weight of sample have been shown in the preceding tables. If rutile TiO₂ is used, increasing the amount of HF or increasing the time-temperature does not result in a dissolution of the TiO₂. The maximum amount of sample treated so that the mica is dissolved completely by a solution consisting of 2 ml. of HF, 5.0 ml. of H₂SO₄, and 50 ml. of distilled water is about 2.0 g. At 3.0 g. of sample, a substantial portion of the mica was left.

Major features of this invention may be better understood by means of the examples which follow, in addition to the extensive experimental data already given. It will be appreciated that these examples and the foregoing data are intended to be typical but not to be limiting in scope. Unless otherwise indicated, throughout this specification and claims, all temperatures are in degrees Centigrade and all parts and percentages are by weight.

EXAMPLE 1

1.00 g. of a pearl reflecting anatase TiO₂ coated mica is weighed into a 250 ml. Nalgene brand (polypropylene) beaker, followed by 50 ml. of distilled water. A plastic-coated stirring bar is added, and the beaker is placed on a heating mantle so that the temperature can be controlled. This is then placed on a magnetic stirrer plate so stirring can be provided during the dissolution process. From a glass pipette are added 5.00 ml. of concentrated $H_2SO_4$ followed by 2.00 ml. of concentrated HF (50%) from a plastic pipette.

The slurry is then heated to 70° C. for 1 hour. 200 ml. of distilled water is added and the slurry is then filtered in a Buchner funnel followed by 500 ml. of distilled water as a wash to remove the acids present. The pigment is dried at 120° C. in an oven for 30 minutes and then weighed. A total of 0.22 g. of platelets are recovered. The platelets are a thin white pearl in reflection color and have a reflectivity of 95%, which is higher than the original material with a relative reflectance of 70%.

EXAMPLE 2

The same procedure is used as in Example 1, except 1.00 g. of green reflecting rutile $TiO_2$ coated mica is used as the starting material.

After drying and weighing, a total of 0.56 g. of pigment product is recovered. A drawdown is prepared from a solution containing one-half the usual pigment concentration, and it shows better luster than the original pigment.

The original pigment has a relative reflectance of 55%, while the treated material has a relative reflectance of 66% at one-half the pigment concentration. The color is unchanged from the original.

EXAMPLE 3

The same procedure is used as in Example 1, except that the starting material consists of 1.00 g. of a rutile $TiO_2$ coated mica product having a gold reflection color and a layer of $Fe_2O_3$ which is about 5% of the product.

After drying and weighing, a total of 0.38 g. of pigment product is recovered. The drawdown of the product pigment still shows a gold reflecting color. The relative reflectivity value is found to be 102%, compared to the original material at 61%.

EXAMPLE 4

The procedure of Example 1 is followed, except that 2.00 g. of rutile $TiO_2$ coated mica of pearl (white) reflection is used as the starting material, and the dissolution bath is doubled in amount. The procedure was then repeated and the total final product was collected. A total of 1.08 g. was recovered out of an initial 4.00 g. of starting material, giving a yield of 27%. The pigment product is pearl white in appearance. A drawdown card at one-half concentration shows a relative reflectance of 95% compared to the original material at 77%.

The metal oxide coated mica nacreous pigments from which the present unsupported pigments are derived generally employ mica plates which pass through a 325 mesh screen and vary in length from about 1–75 microns. Preferably, most of the mica plates are about 2–35 microns in length. The mica plates are generally about 0.03–3.0 microns in thickness and usually average about 0.25 microns. The average BET specific surface area is about 1–6 square meters per gram and preferably about 2–4.5 square meters per gram. The mica is usually between 40 and 90%, and most usually 60–80% of the weight of the pigment. The metal oxide coating is generally about 5–500 nanometers thick and preferably about 20–350 nanometers. The unsupported nacreous pigment of the present invention constitutes platelets of the metal oxide which vary in length from about 1–75 microns and preferably about 2–35 microns and have a thickness of about 5–600 nm, preferably about 20–400 nm. The unsupported pigment can contain up to 20% by weight mica and preferably contains at least about 1% mica.

The unsupported pigment of the present invention is unique as a nacreous pigment in that it combines the most favorable or optimum optical effects of known pigments together with a maximum stability in use in a variety of media and conditions while being non-toxic. No other nacreous pigment has the same set of characteristics.

Since the pigment is derived from $TiO_2$ coated mica which is calcined at high temperature, it maintains all of the stability and inertness displayed by the $TiO_2$ coated mica while exhibiting high luster and excellent coverage at much lower concentrations. The present pigment is superior to the pigment derived from $TiO_2$ coated calcium sulfate because it is easier to produce and because it has a higher degree of smoothness and perfection of pigment surfaces at microscopic levels. For example, the titanium dioxide coated calcium sulfate nacreous pigment and the unsupported $TiO_2$ nacreous pigment derived therefrom (at one-half concentration and which still contains some calcium sulfate) exhibit a lower luster and reflection color intensity than a $TiO_2$ coated mica nacreous pigment of the same color while the unsupported metal oxide platey nacreous pigment of the present invention exhibits at least the same degree of luster and reflection color intensity as the metal oxide coated mica nacreous pigment from which it is derived at one-half the weight thereof in a standard drawdown.

Basic lead carbonate nacreous pigments have luster and reflection interference intensity color effects comparable to those of the present unsupported product. However, the basic lead carbonate is burdened with very serious disadvantages. Since it contains lead, it cannot be used in cosmetics or in plastics for food wrapping or containing purposes, and it also faces restrictions in other applications. Further, basic lead carbonate is unstable in certain media and under some conditions. For example, it alters or decomposes at about 250° C. and above and at lower temperature in certain plastic media. The present unsupported pigment is markedly stable under these conditions, and, of course, does not contain lead.

Various changes and modifications can be made in the process and products of this invention without departing from the spirit and scope thereof. The various embodiments set forth herein were for the purpose of illustration only and were not intended to limit the invention.

What is claimed is:

1. A method for the preparation of a nacreous pigment which comprises the step of subjecting a non-toxic metal oxide coated mica nacreous pigment to an extractive dissolution by contacting said pigment with an aqueous acidic solution comprising hydrofluoric acid together with a mineral acid at an elevated temperature until the desired amount of mica has been removed and the luster has thereby been increased, and recovering the resulting pigment.

2. The method of claim 1 wherein said mineral acid is sulfuric acid.

3. The method of claim 1 wherein the metal oxide coated mica nacreous pigment in the aqueous acid is in a concentration of about 1–20%, the hydrofluoric acid is at a concentration of about 1–20% and the mineral acid is at a concentration of about 2–30%.

4. The method of claim 3 wherein the metal oxide coated mica nacreous pigment concentration is about 2-10%, the hydrofluoric acid concentration is about 4-10% and the mineral acid concentration is about 5-20%.

5. The method of claim 1 wherein said contacting is effected at a temperature of about 30°-100° C.

6. The method of claim 5 wherein said temperature is about 50°-80° C.

7. The method of claim 1 wherein said metal oxide coated mica nacreous pigment is a titanium dioxide coated mica nacreous pigment.

8. The method of claim 7 wherein said titanium dioxide is in the rutile crystalline form.

9. A non-toxic metal oxide coated mica nacreous pigment in which at least about half of the mica has been removed by dissolution.

10. An unsupported non-toxic metal oxide platey nacreous pigment comprising platelets of metal oxide of about 1-75 microns in length and about 5-600 nm in thickness, incorporating up to 20% mica and exhibiting at least the same luster and reflection color intensity of double the weight of the corresponding metal oxide coated mica nacreous pigment of the same reflection color.

11. The unsupported metal oxide platey nacreous pigment of claim 10 having a length of about 2-35 microns, a thickness of about 20-400 nm and containing at least 1% mica.

12. The unsupported metal oxide platey nacreous pigment of claim 11 wherein said metal oxide is titanium dioxide.

13. The unsupported metal oxide platey nacreous pigment of claim 12 wherein said titanium dioxide is in the rutile crystalline form.

14. The unsupported metal oxide platey nacreous pigment produced by the process of claim 1.

15. The unsupported metal oxide platey nacreous pigment produced by the process of claim 8.

* * * * *